United States Patent [19]

Goldmacher

[11] 4,324,205
[45] Apr. 13, 1982

[54] SAFETY HARNESS

[76] Inventor: Jerome Goldmacher, 12 Sheppard La., Stony Brook, N.Y. 11790

[21] Appl. No.: 177,290

[22] Filed: Aug. 12, 1980

[51] Int. Cl.³ .................................. A62B 35/00
[52] U.S. Cl. .................................. 119/96; 2/305
[58] Field of Search ............... 119/96; 2/93, 94, 300, 2/305

[56] References Cited

U.S. PATENT DOCUMENTS

| | | | |
|---|---|---|---|
| 1,288,170 | 12/1918 | Pick | 119/96 |
| 1,697,363 | 1/1929 | Losey | 119/96 |
| 2,132,556 | 10/1938 | Blackshaw | 119/96 |
| 3,004,519 | 10/1961 | Weissman | 119/96 |
| 3,276,430 | 10/1966 | Murcott | 119/96 |
| 3,533,107 | 10/1970 | Raneri et al. | 2/93 |
| 4,028,742 | 6/1977 | Marquis | 2/305 |

*Primary Examiner*—Hugh R. Chamblee

[57] ABSTRACT

A safety harness that may be worn by a motorcyclist or the like is disclosed and comprises a pair of straps that extend over his shoulders. The portions of the straps that are positioned over the chest and the back of the cyclist are provided with hand grips. The straps may terminate in loops through which a belt may be passed. The tandem rider may grasp the pair of hand gripping members that are integral with either the portion of the straps in the front over the cyclist's chest or the pair of hand gripping members that are over the cyclist's back. In this manner the tandem rider is more responsive to the movement of the cyclist's upper torso.

12 Claims, 5 Drawing Figures

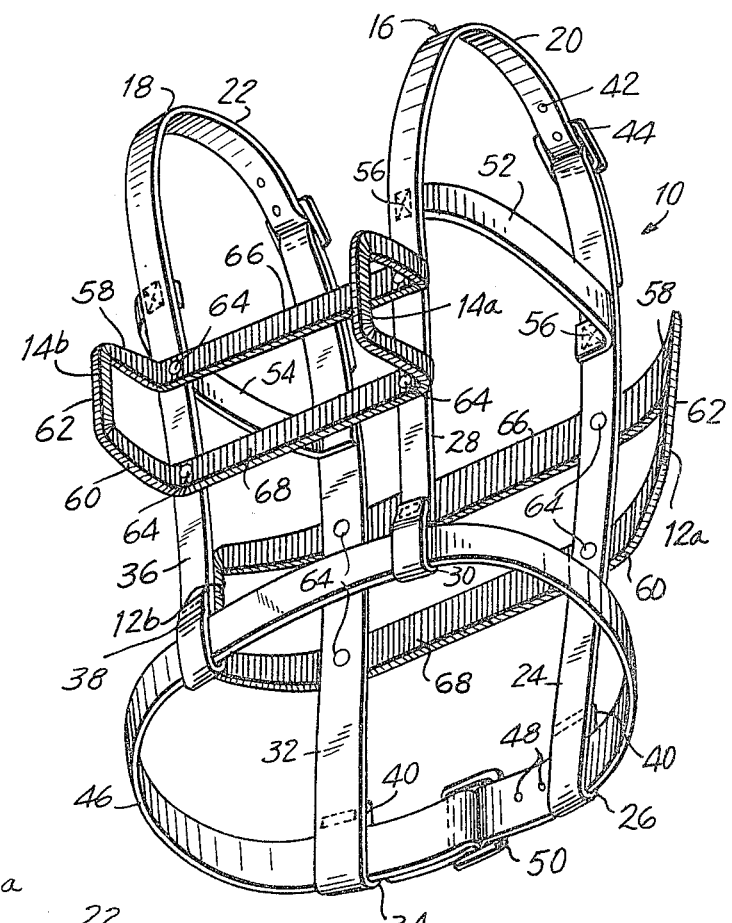

SAFETY HARNESS

This invention relates generally to harnesses or the like, and more particularly to a safety harness that may be worn by a motorcyclist or the like and which is adapted to be gripped by a pillion or tandem rider.

It has long been recognized that there is a need for a safety harness to be worn by the lead rider on a motorcycle and which may be gripped by the pillion or tandem rider. The purpose for such a harness is to provide the pillion rider with a somewhat greater degree of safety since he may grasp a portion of the harness and thereby minimize any interference with the lead rider or driver.

One example of the prior art in the field to which the present invention is directed is disclosed in U.S. Pat. No. 3,940,801 issued on Mar. 2, 1976 in the name of Lawrence H. Riggs et al. This patent very simply provides a pair of straps along the longitudinal axis of the outside face of the belt worn by the lead rider and used by the pillion rider to maintain a grip. The belt comprises four slits spaced apart along a longitudinal axis, a pair of straps along the longitudinal axis of the outside face of the belt with the ends of each of the belts being inserted through a corresponding slit and fastened to the inside of the belt and means for fastening the belt. The pillion rider grips the belt to prevent falling when the ride is rough and the grip becomes loose. It will be evident from the Riggs et al. patent that the pillion rider maintains contact with the lead rider only at the waist portion of the lead rider.

Another example of the prior art in the general field to which the present invention is directed is disclosed in U.S. Pat. No. 3,896,499 granted on July 29, 1975 to Charles E. Kelly. In the Kelly patent a belt that is worn about the waist of the lead rider is provided with two pairs of loops. The pillion rider may grasp either the rear pair of loops with his hands or he may extend his hands and wrists through the rear pair of loops and grasp the forward pair of loops. In either event, the pillion rider maintains contact with the lead rider about the waist of the lead rider.

Another form of prior art is disclosed in U.S. Pat. No. 3,564,616 granted on Feb. 23, 1971 to Angelo F. Battaglia. In this last mentioned U.S. Patent a belt is worn by the lead rider and a double ended loop is secured to the outside surface of the belt over the surface thereof that is positioned over the stomach or forward portion of the lead rider. The tandem rider, using the structure disclosed in the Battaglia patent grasps both loop portions in order to maintain contact with the waist of the lead rider.

Yet another form of prior art in the same general field is disclosed in U.S. Pat. No. 3,562,812 granted on Feb. 16th, 1971 to William R. Greggains. In this last mentioned patent, an adjustable length strap, having hand holes at the ends thereof, to encircle the waist of the lead rider of a motorcycle or the like is provided with hand holding portions which are gripped by the rear or tandem rider. The strap in the Greggains patent may be built into a safety jacket to be worn by the lead rider and the safety jacket may have safety gripping slots as an alternative means to be used by the rear or tandem rider. Once again, as in the previous patents discussed hereinbefore, the rear or tandem rider must maintain contact with the lead rider only at his waist portion.

U.S. Pat. No. 3,487,474, granted on Jan. 6, 1970 to Anthony J. DeMeo discloses still another belt that is adapted to encircle the waist of the lead rider of a motorcycle or the like. In the DeMeo patent, a pair of hand grips are rigidly secured to the rear half of the belt in order to permit the hands of the tandem rider to grasp the hand grips. It will be evident that the DeMeo patent is of value only for its disclosure of means that permit the pillion rider to maintain contact with the waist of the lead rider.

U.S. Pat. No. 3,533,107 granted on Oct. 13, 1970 to Anthony Raneri et al, also discloses a waistband or belt having hand gripping loops that may be grasped by the pillion or tandem rider. However, the Raneri et al. patent is distinguished from the previously discussed prior art in that straps which extend over the lead rider's shoulder and which terminate at the waist encircling belt are also disclosed. In spite of the provision of the shoulder encircling straps, the tandem rider utilizing the Raneri et al. structure must grip the lead rider at his waist.

Still another form of prior art which teaches shoulder straps is disclosed in U.S. Pat. No. 3,840,902, granted on Oct. 15, 1974 in the name of Charles F. McNeill. In this last mentioned patent a waist encircling belt having hand gripping members is also provided in combination with straps that extend over the shoulders of the lead driver and which criss-cross over the chest and back of the lead driver. In common with the previous examples of the prior art that have been discussed, the McNeill patent requires that the tandem or pillion rider contact the lead rider about his waist.

Finally, U.S. Pat. No. 4,028,742 granted on June 14, 1977 in the name of Wilfred Marquis teaches a waist encircling belt having hand gripping portions in the form of loops as well as shoulder encircling straps and a chest encircling strap. The shoulder encircling straps start and end at the waist encircling strap and are criss-crossed. The chest encircling strap is secured to the two shoulder encircling straps at the intersection thereof. However, the construction disclosed in the Marquis patent still requires that the tandem or pillion rider maintain contact with the waist portion of the lead rider.

The present invention is very clearly distinguished over the prior art in that the tandem or pillion rider grips the harness worn by the lead rider at an elevated position that is approximately at the level of the armpits of the lead rider.

It should be readily apparent that the pillion or tandem rider will be substantially more sensitive to the movement of the lead rider if he, the tandem rider, is cognizant of any lateral movement of the upper torso of the tandem rider. Stated another way, when the lead rider leans either to the left or to the right when turning, this motion will be exaggerated by his upper torso and, to a greater extent, will be communicated to the tandem rider than will any motion of his waist which results from the same movement. It is imperative that the pillion or tandem rider be responsive to the torso movement of the lead rider so as not to interfere with the delicate balancing required in riding a motorcycle. The present invention takes into account this need and provides structure that permits the tandem rider to be fully responsive to the upper torso movements of the lead rider while still maintaining absolute safety.

In its broadest aspect, the present invention provides a safety harness that is adapted to be worn by the lead rider of a motorcycle, and which is also adapted to be gripped by a pillion rider. The present invention provides first and second elongated strap members each of which includes a central portion that is adapted to pass over the right and left shoulders of the lead rider. The two straps have front and rear portions which extend over the chest and back of the lead rider and which terminate at his waist. Two pairs of hand grip members are also provided. The forwardly located hand gripping members are positioned approximately at the armpit level of the lead rider and when not being used extend along the sides of his chest, approximately under his arms. The rear pair of hand grip members are also located approximately at armpit level and extend in a direction away from the back of the lead rider. Auxillary straps that extend between and which are coupled to the front and rear portions of the shoulder straps may also be provided.

The present invention also provides that the shoulder straps be adjustable in order to accommodate the different physical proportions of the lead rider. It is also within the scope of the present invention to provide loops at the end of the shoulder straps in order to permit an adjustable belt to be passed therethrough so as to permit the shoulder strap to be securely positioned on the lead rider or to provide a harness including an integral belt.

In an alternative embodiment of the present invention the shoulder straps are criss-crossed over the chest and/or the back of the lead rider.

Accordingly, it is an object of the present invention to provide an improved safety harness that may be worn by the lead rider of a motorcycle and which may be grasped by the pillion rider of the motorcycle.

Another object of the present invention is to provide an improved safety harness, as described above, wherein the pillion rider maintains contact with the rider through the safety harness and at a level other than the waist portion of the lead rider.

A feature of the present invention is that the shoulder straps may be made adjustable so as to accommodate the physical proportions of different sized lead riders.

An advantage of the present invention is that the tandem rider is more fully responsive to the movements of the upper torso of the lead rider.

In the drawings, like reference characters designate like parts.

In the drawings:

FIG. 4 is another perspective view illustrating the safety harness shown in FIG. 3 but from the rear thereof; and FIG. 5 is a perspective view of an alternative embodiment of the present invention as viewed from the front thereof.

Figure 1:
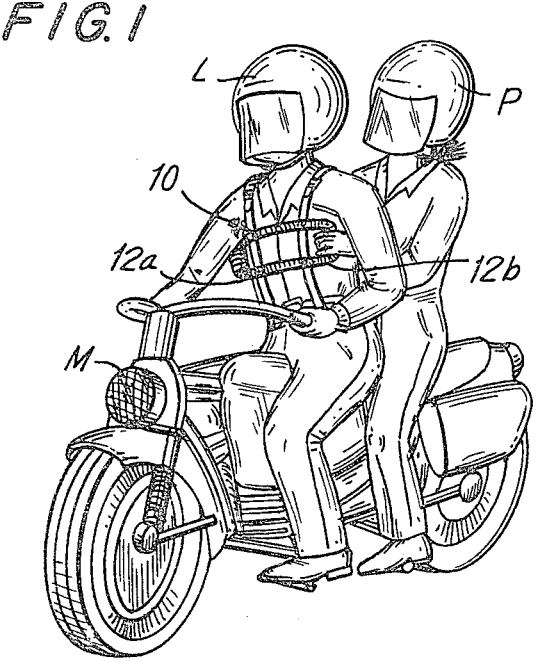
FIG. 1 is a perspective view illustrating the application of the present invention to the lead and tandem riders of a motorcycle with the tandem rider grasping the forwardmost pair of gripping members.
Figure 2:
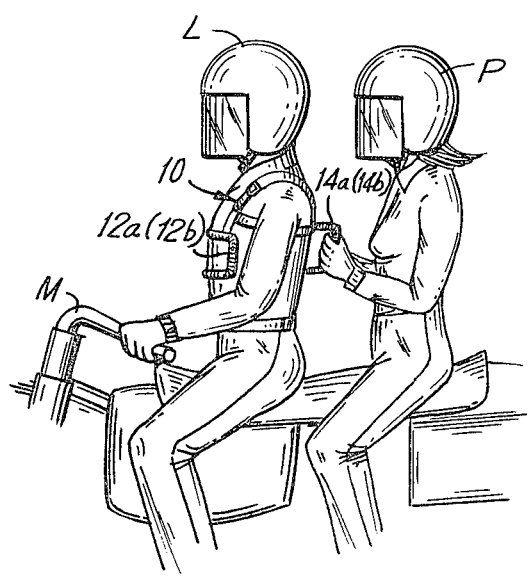
FIG. 2 is a side elevational view similar to FIG. 1 but illustrating the tandem rider gripping the rearwardmost pair of gripping members.

Referring now to the drawings, FIGS. 1 and 2 illustrate two different methods of utilizing the present invention. As shown in FIG. 1, the lead rider L of a motorcycle M wears the harness 10 comprising the present invention. The pillion rider P grasps the forwardmost pair of gripping members 12a and 12b that extend rearwardly from the chest area of the lead rider L. Alternatively, should the pillion rider P wish to maintain a greater distance from the lead rider L, the pillion rider P may grasp the rearwardly directed gripping members 14a, and 14b as shown in FIG. 2.

Figure 3:
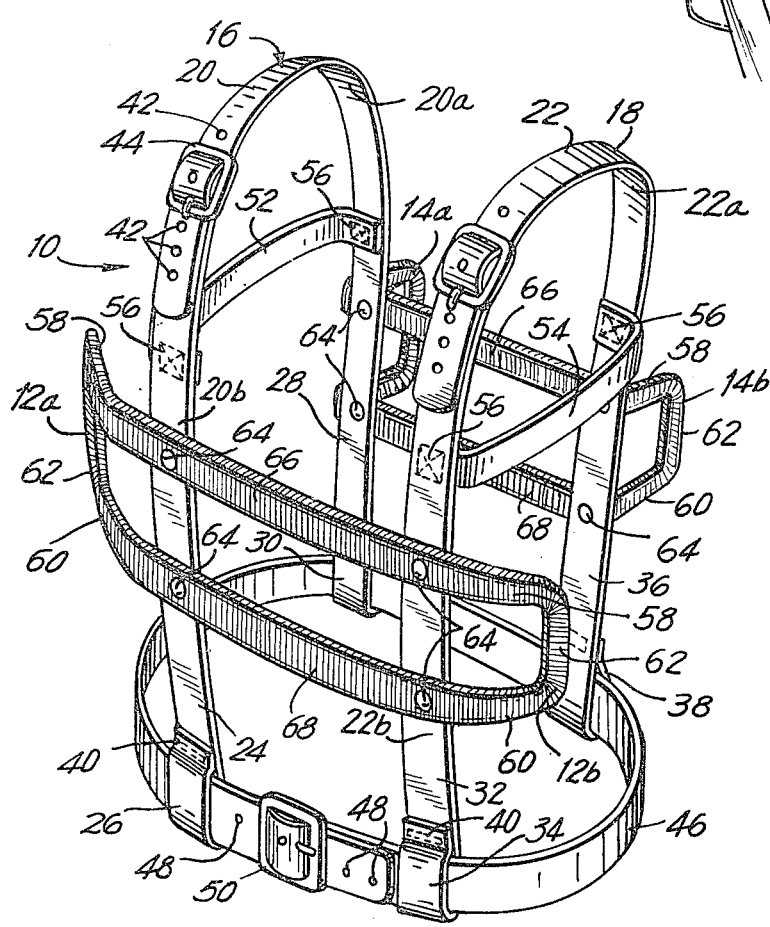
FIG. 3 is a perspective view of the safety harness comprising the present invention as viewed from the front thereof.

The construction of the present invention may best be understood by reference now to FIGS. 3 and 4. As shown in the drawings, there are provided elongated first and second strap members 16 and 18 that are comprised of central portions 20 and 22, respectively, which pass over the right and left shoulders of the lead rider L. The strap 16 includes a forward end portion 24 having a loop 26 and a rear end portion 28 having a loop 30. Similarly, the strap 22 has a forward end portion 32 including a loop 34 and a rearward end portion 36 including a loop 38. The loops 26, 30, 34 and 38 may be formed by bending upwardly the end portions 26, 28, 32 and 36, respectively, and stitching the confronting surfaces to each other as shown by the reference characters 40. Alternatively, the stitches 40 may be replaced by rivets, adhesives or the like.

In order to accommodate lead riders of different sizes, the straps 20 and 22 are formed in two sections 20a, 20b, and 22a, 22b, respectively. In a manner known, per se the strap sections 20a and 22a, are provided with a plurality of axially spaced apart holes 42 while the sections 20b and 22b are each provided with an appropriate buckle 44. The length of the straps 20 and 22 may be varied by engaging the buckle 44 with a different one of the holes 42 as required. Similarly, a belt 46 may also be provided with the belt 46 being arranged to pass through the loops 26, 30, 34 and 38, as shown in FIGS. 3 and 4. In a manner known per se, one end of the belt 46 is also provided with a plurality of holes 48 while the other end of the belt 46 is provided with an appropriate buckle 50. In this manner, the belt may be adjusted to the size of the waist of the lead rider. To provide still further security and comfort, side straps 52 and 54 may also be provided in such a manner that they each extend between the forward and rearward ends of the straps 16 and 18. As shown in FIGS. 3 and 4, stitching designated by the reference characters 56 may be employed for the purpose of securing the side straps 52 and 54 to the forward and rearward portions of the straps 16 and 18. Alternatively, rivets or the like may be used in place of the stitches 56.

Whereas it is contemplated that the straps 16 and 18, the belt 46 and the side straps 52 and 54 may be fabricated from a relatively flexible material such as leather, canvas, nylon webbing, synthetics such as plastic or the like, a more rigid material may be used for the hand gripping members. Although it is not absolutely essential, the hand gripping members 12 and 14 may be molded to shape utilizing a plastic or rubberlike material. The hand gripping members are each comprised of a pair of spaced part legs 58 and 60 as well as a transverse portion 62 that connects one end of the legs 58 and 60. As may be seen in FIGS. 3 and 4, the hand gripping members 12a and 12b are secured to the straps 16 and 18 at a location intermediate the shoulder engaging portions 20 and 22 and the end portions thereof designated by the reference characters 24, 28 and 32, 36 by means of rivets 64 or the like. In order to provide still further lateral support connecting links 66 and 68 are provided. The links 66 and 68 are integral with and extend between the ends of the legs 58 and 60 that are remote from the transverse portions 62 of the hand gripping members 12a, 12b and 14a, 14b.

An alternative embodiment of the present invention is shown in FIG. 5. This second embodiment of the invention is distinguished over the first embodiment of the invention shown in FIGS. 3 and 4 by virtue of the fact that the straps 16 and 18 are criss-crossed in the front and back and are secured to each other by means of stitches 70 and 72 or the like. Additionally, D-rings 74 are shown in place of the buckles 44 since it is well known that such a substitution can be made. Similarly it should be readily apparent that the D-rings 74 could also be employed in the embodiment of FIGS. 3 and 4 as well. All of the remaining structure shown in FIG. 5 is identical with that of the embodiment shown in FIG. 3 and in FIG. 4 so that it is not believed that a repetition of the description thereof is necessary. However, for purposes of explanation, the reference characters are repeated.

An improved safety harness has been disclosed hereinabove. The safety harness is easily grasped and is made of a non-slipping and sure gripping surface which is not effected by cold or heat to the detriment of the comfort of either the lead rider of the pillion rider. The construction described hereinabove allows for uniform distribution of loads throughout the harness which can be worn as an overgarment by the lead rider of a motorcycle when carrying a pillion rider. The harness described hereinabove adds substantially to the safety and comfort of the pillion rider with little or no inconvenience to the lead rider. Waist adjustments for size and D-ring type shoulder adjustments are also included. Fore and aft hand grips made of any suitable non-rigid harness material are secured to the downwardly extending front and rear portions of the shoulder straps in a position that is proximate the armpits of the lead rider. Both front and rear hand grips are integrally attached to the vertical straps in order to prevent lateral movement of either strap held by the pillion rider. The hand grips may be formed from a rolled harness material for example and the safety harness may be manufactured either with wide loops at the base of the vertical straps to accept any wide belt, or with a belt that is an integral unit with the harness. It is contemplated that the belt, straps, and hand grips may be made of heavy cancas or nylon webbing while the belt buckle and the D-rings may be made of brass or of a non-ferrous material. Stitching as is conventional in the harness arts or riveting which is also conventional may be employed where appropriate.

There has been disclosed heretofore the best embodiments of the invention presently contemplated. However, various changes and modifications may be made thereto without departing from the spirit of the invention.

What is claimed is:

1. A safety harness adapted to be worn by a lead rider such as a motorcyclist or the like and adapted to be gripped by a pillion or tandem rider, said safety harness comprising:
   elongated first and second strap members each having a central portion that is adapted to pass over the right and left shoulders, respectively, of the lead rider and front and rear strap portions that terminate at respective end portions proximate the right and left sides of the waist of the lead rider when the harness is being worn; and
   a plurality of pairs of hand grip members, each of said hand grip members being integral with said front and rear strap portions at a location that is intermediate said central and said front and rear end portions thereof, respectively, to thereby define front and rear pairs of gripping members, when the harness is worn said front pair of gripping members being located proximate the chest of the lead rider and the rear pair of gripping members being located proximate the back of the lead rider,
   whereby with equal facility, the pillion rider may grasp either the front or the rear pairs of gripping members.

2. The safety harness according to claim 1, wherein said first and said second strap members include means for varying the length thereof.

3. The safety harness according to claim 1, wherein each said strap member includes a side strap that is coupled thereto and which extends between said respective front and rear portions of said strap members.

4. The safety harness according to claim 1, wherein said terminal portions of each of said strap members includes a loop for receiving a belt that is adapted to be worn by the lead rider.

5. The safety harness according to claim 4, further including a belt extending through said loops, said belt being adapted to encircle the lead rider proximate the waist portion thereof.

6. The safety harness according to claim 5, wherein means are provided for varying the effective length of said belt.

7. The safety harness according to claim 1, wherein said first and said second strap members are in a fore and aft, criss-cross configuration whereby said end portions of said first strap member terminates proximate the left side of the waist of the lead rider when the safety harness is being worn and whereby said end portions of said second strap member terminate proximate the right side of the waist of the lead rider when said safety harness is being worn.

8. The safety harness according to claim 7, wherein said first and said second strap members are secured to each other at the respective front and rear intersections thereof.

9. The safety harness according to claim 1, wherein each said hand grip member is substantially U-shaped and is defined by a pair of spaced apart, elongated legs that are rigidly secured at one end thereof to said strap members and a transverse portion that connects the opposite end of said legs.

10. The safety harness according to claim 9, wherein there is further included connecting links integral with and extending between said strap members, said connecting links joining the ends of said opposed legs that are remote from said transverse portion of said hand grip members.

11. The safety harness according to claim 1, wherein said first and said second strap members are in a criss-cross configuration over the chest of the lead rider when said safety harness is being worn whereby said end portions of said first strap member terminates proximate the left side of the waist of the lead rider when the safety harness is being worn and whereby said end portions of said second strap member terminate proximate the right side of the waist of the lead rider.

12. The safety harness according to claim 1, wherein said first and said second strap members are in a criss-cross configuration over the back of the lead rider when said safety harness is being worn whereby said end portions of said first strap member terminates proximate the left side of the waist of the lead rider when the safety harness is being worn and whereby said end portions of said second strap member terminate proximate the right side of the waist of the lead rider.

* * * * *